Dec. 30, 1941.   R. RILEY   2,267,841

METHOD OF AND APPARATUS FOR TREATING WATER

Filed June 14, 1940

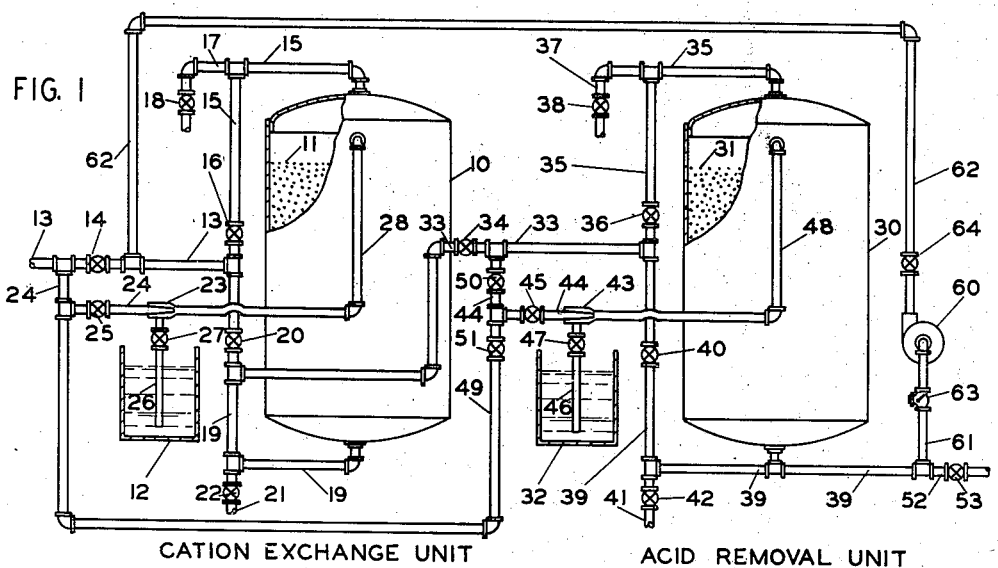

FIG. 1

CATION EXCHANGE UNIT      ACID REMOVAL UNIT

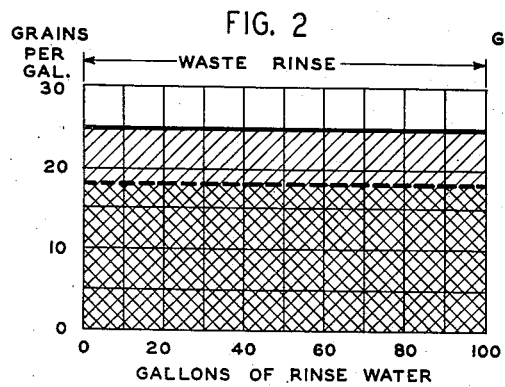

FIG. 2

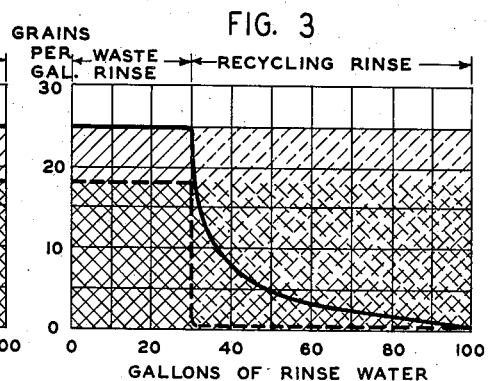

FIG. 3

| LEGEND FOR FIGS. 2 AND 3 | |
|---|---|
| CATION CONTENT OF INFLUENT TO CATION EXCHANGE UNIT | ——— |
| FREE MINERAL ACID CONTENT OF INFLUENT TO ACID REMOVAL UNIT | — — — — |
| CATION EXCHANGE CAPACITY LOST | ▨ |
| ACID REMOVAL CAPACITY LOST | ▨ |
| CATION EXCHANGE CAPACITY SAVED BY RECYCLING RINSE | ▨ |
| ACID REMOVAL CAPACITY SAVED BY RECYCLING RINSE | ▨ |

INVENTOR:
RAY RILEY
BY
ATTORNEY

Patented Dec. 30, 1941

2,267,841

UNITED STATES PATENT OFFICE 2,267,841

METHOD OF AND APPARATUS FOR TREATING WATER

Ray Riley, Birmingham, N. J., assignor to The Permutit Company, New York, N. Y., a corporation of Delaware Application June 14, 1940, Serial No. 340,451

9 Claims. (Cl. 210—24)

This invention relates to method of and apparatus for treating water; and it comprises removing electrolytes from water by successive passage through a cation exchange unit and an acid removal unit, regenerating said units from time to time, and recycling certain portions of the effluent from the acid removal unit back into the cation exchange unit; all as more fully described hereinafter and as claimed.

One of the more recently developed methods of purifying water is by the use of two different regenerative ion exchange materials operated in series for the purpose of de-mineralizing water, i. e. removing electrolytes from it. The water to be treated is first passed through a bed of granular cation exchange material charged with hydrogen ions and thence through a bed of granular anion exchange or acid removal material charged with hydroxyl ions. On passing through the cation exchange material the metallic cations of the salts contained in the water to be treated are exchanged for hydrogen ions so that the water then contains free mineral acids such as hydrochloric, sulfuric and other hydrogen acids formed with whatever anions are present in the water undergoing treatment, as well as carbonic acid. Upon passage of this acid water through the bed of acid removal material the free mineral acids are almost completely removed; the carbonic acid, being only slightly changed by the acid removal material, may be eliminated by the simple expedient of aeration if $CO_2$ is undesirable in the use to which the treated water is to be subjected. Water treated in this manner has so low a dissolved solids content that its quality is comparable to that of distilled water.

The best way of carrying out this process of de-mineralizing is to place a bed of each of the ion exchange materials into a tank provided with the valves and connections required to control flow through the tanks.

It is the nature of the ion exchange materials used in this method of electrolyte removal to become exhausted after a certain extent of use, and they must then be recharged with the kind of ion serving their particular purpose. To this end, the cation exchange material is regenerated with dilute acid, such as sulfuric or hydrochloric acid, while the acid removal material is regenerated with the dilute solution of an alkali, such as caustic soda, soda ash, sodium bicarbonate, ammonium hydroxide or the like.

After regeneration the ion exchange materials must be freed by rinsing of excess regenerant and of the products resulting from the regenerating reactions. Such rinsing proceeds fairly rapidly in the case of the cation exchange material charged with hydrogen ions. With the acid removal material, rinsing is very effective at first but quite slow in the later stages, the reason being that considerable quantities of the regenerant are adsorbed as such by the acid removal material and are but slowly eliminated by dilution and leaching. In the past it has been the practice to rinse the acid removal material with raw water passed first through the cation exchange material. In doing this, relatively large amounts of rinse water are required because of the slow rinsing properties of the acid removal material which has the disadvantage of not only requiring considerable time during which the units were not available for the treatment of water, but also of using up substantial portions of the ion exchange capacity of both units, thus reducing the quantities of water that can be treated between regenerations.

Where a continuous supply of treated water is required, it is necessary either to provide for adequate storage of treated water or to install two sets of units one of which may be regenerating while the other is being used for the treatment of water. Either of these arrangements is relatively costly and consumes considerable space without, however, in any way overcoming the disadvantage of the wasting of ion exchange capacity as well as of large quantities of water used in the rinsing of the acid removal unit.

One object of my invention is to decrease the quantity of rinse water which is discharged to waste; another object is to increase the useful ion exchange capacity, between regenerations, of each of the two units; a third object is to reduce the time required for rinsing the acid removal material; and a further object of my invention is to improve the quality of the treated water.

I attain these objects by recycling into the cation exchange unit certain portions of the water leaving the acid removal unit.

One way of practicing my invention is to recycle into the cation exchange unit the rinse water leaving the acid removal unit during the later stages of rinsing. The first portion of rinsing the acid removal unit is carried out with raw water passed through the cation exchange unit, as has been customary in the past. The electrolyte content of the rinse effluent from the acid removal unit drops relatively rapidly to 300–500 parts per million and continues to drop fairly quickly to about 100 parts per million. As soon as this rinse effluent has reached an electrolyte content of about 200 parts per million, generally equal to or somewhat lower than that of the raw water supplied to the cation exchange unit, and when it contains sodium as cation and mostly hydroxide, carbonate and bicarbonate as anions in the presence of small amounts of chloride and sulfide anions, the supply of raw water to the cation unit is interrupted and the rinse effluent of the acid removal unit is recycled into the cation exchange unit. This recycling is continued until the electrolyte content of the rinse effluent has reached a sufficiently low value whereupon recycling is discontinued, raw water is supplied to the cation unit and de-mineralized water is discharged from the acid removal unit to service.

During rinsing some capacity of the acid removal unit is consumed by the free mineral acids contained in the rinse water, essentially hydrochloric and sulfuric acid. Since the sulfate and chloride content of the rinse effluent from the acid removal unit during the recycling step is relatively low, much lower on the average than that of the raw water, this recycled water upon passage through the cation exchange unit contains only small amounts of hydrochloric and sulfuric acid and consequently uses up but little of the exchange capacity of the acid removal unit. The capacity of the cation exchange unit on the other hand is only consumed in the formation of hydrochloric, sulfuric and carbonic acid, and since, as has been stated above, only small amounts of these acids are formed in the recycled rinse water there is but a small loss in the exchange capacity of the cation exchange unit. Thus, due to recycling of the rinse water the exchange capacity of both ion exchange units is conserved and a greater capacity is, therefore, available for use than is available when all the rinse water is discharged to waste. The amount of capacity thus saved is of course the greater in both units, the higher the electrolyte content of the raw water undergoing treatment.

In recycling, the rinse water may be circulated at a relatively high rate of flow, thus reducing the time required for the rinsing operation. In this connection it may be noted that some saving in the time required for rinsing may be realized without recycling by increasing the rate of flow of rinse water but only at the expense of a still greater consumption of water for the rinsing operation with consequent greater loss in capacity between regenerations, for both units.

During recycling the electrolyte content of the rinse water drops very rapidly so that the recycled water soon approaches the quality of distilled water in its dissolved solids content. The result of this is that rinsing is more effective and a thoroughly de-mineralized effluent is obtained from the acid removal unit after a shorter rinse period than without recycling.

Another way of practicing my invention is to recycle a portion of the de-mineralized water discharged by the acid removal unit during normal service, mixing this recycled water with the raw water supplied to the cation exchange unit. When the raw water to be de-mineralized contains relatively large amounts of sulfates and chlorides, in the neighborhood of 300 parts per million or more, expressed as calcium carbonate, it is sometimes difficult to obtain the desired extent of de-mineralization by a single passage of the water through a single set of ion exchange and acid removal units. In such cases it is necessary to provide two sets of units in series where a treated water with substantially zero electrolyte content is required. By recycling a portion of the de-mineralized effluent from the acid removal unit back into the inlet of the cation exchange unit the desired more complete electrolyte removal is readily obtained since such recycling dilutes the raw water with a water practically free of dissolved matter and thus supplies to the cation exchange unit diluted raw water of relatively low electrolyte content which is readily de-mineralized to any desired extent by passage through a single set of units. An incidental but important advantage of this method of operation is that the useful life of the acid removal material is substantially increased. Acid removal materials such as iron oxide gels are subject to aggressive attack when the water passed through such materials contains relatively high amounts of free mineral acid; since, by means of recycling, the salt content of the water admitted to the cation exchange unit may be reduced to any desired extent, the water flowing from the cation exchange unit to the acid removal unit has a correspondingly reduced concentration of free mineral acidity and the acid attack on the acid removal material is accordingly reduced.

The proportion of de-mineralized water recycled in this manner should depend on the sulfate and chloride content of the raw water being treated. The higher this anion content is the greater a proportion is advantageously recycled. A good criterion for determining the quantity of water to be recycled is that the mixture of raw water and recycled de-mineralized water supplied to the cation exchange unit should contain between 100 and 200 parts per million of sulfates and chlorides, expressed as $CaCO_3$. Sometimes it may be desirable to reduce the cation content of the mixture of raw and recycled water even below 100 parts per million in order to obtain a still better quality of treated water and, at the same time, further increase the life of the acid removal material.

In the appended drawing,

Fig. 1 is a diagrammatic elevation, partly in section, of a water treating plant in accordance with my invention;

Fig. 2 is a diagrammatic representation of a rinsing operation without recycling; and Fig. 3 is a similar diagrammatic representation of a rinsing operation with recycling, in accordance with my invention.

Referring now to Fig. 1, a cation exchange unit comprises a tank 10 containing a bed 11 of granular carbonaceous cation exchange material. Associated with tank 10 is a tank 12 containing regenerating solution, e. g., dilute sulfuric acid. A supply pipe 13 for raw water to be treated is fitted with a valve 14 and communicates with a pipe 15 leading to the top of tank 10 and fitted with a valve 16. A backwash water outlet 17 provided with a valve 18 is connected to pipe 15. A pipe 19 with valve 20 leads to the bottom of tank 10 and also communicates with a rinse outlet 21 provided with a valve 22. An ejector 23 communicates with supply pipe 13 through pipe 24 with valve 25 and also has a suction pipe 26 leading into tank 12 and fitted with a valve 27, and a discharge 28 leading into tank 10 above the top of bed 11.

An acid removal unit comprises a tank 30, containing a bed 31 of granular acid removable material which may be carbonaceous anion exchange material, iron oxide gel, synthetic resin or inert material impregnated with synthetic resin, and adapted to remove free mineral acid from solution. A tank 32 containing a dilute solution of an alkali such as caustic soda, soda ash, sodium bicarbonate, ammonium hydroxide or the like, is associated with tank 30. A supply pipe 33 connected to pipe 19 communicates through valve 34 with pipe 35 leading through a valve 36 to the top of tank 30 and with pipe 39 leading through valve 40 to the bottom of tank 30. A backwash outlet pipe 37 with valve 38 communicates with pipe 35, and a rinse water waste outlet 41 with valve 42 communicates with pipe 39. An ejector 43 has a supply pipe 44 fitted with valves 45 and 50 and communicating with supply pipe 33, a suction connection 46 leading into tank 32 and fitted with valve 47, and a discharge 48 leading into tank 30 above the top of bed 31. A by-pass pipe 49 with valve 51 interconnects pipes 13 and 44. An outlet 52 for de-mineralized water, fitted with a valve 53, leads from pipe 39 to a point of use.

For the purpose of recycling water in accordance with my invention there is provided a pump 60 having a suction pipe 61 connected with pipe 39 and a discharge pipe 62 connected with pipe 13. A check valve 63 is provided in order to prevent contamination of the de-mineralized water by a flow of raw water from supply pipe 13 to outlet pipe 52, and a manually operated valve 64 serves for regulating the rate of flow of water being recycled.

In normal operation of the apparatus illustrated in Fig. 1, valves 14, 16, 34, 36 and 53 are open while all other valves are closed. Raw water then enters through supply pipe 13, flows downwardly through the bed 11 of cation exchange material, thence downward through the bed 31 of acid removal material, and passes through pipe 52 to a point of use.

When the exchange capacity of the cation exchange unit has been exhausted, it is restored by the customary process of regeneration, the effluent passing to waste through pipe 17 during backwashing, and through pipe 21 during acid introduction, and during rinsing.

When the capacity of the acid removal unit has been exhausted, it is restored by a regenerating process which comprises backwashing, introduction of alkali solution from tank 32, waste rinse and recycling rinse. The first three steps of this regenerating operation are carried out as heretofore except that the waste rinse step is reduced in duration, i. e. is terminated after passage of a lesser quantity of rinse water to waste. For the steps of backwashing and alkali introduction, either raw water may be used through pipe 49, or effluent from the cation exchange unit via pipe 33, as desired. For rinsing, however, only effluent from the cation exchange unit should be used. During the waste rinse step the rinse water flows via pipe 33, valve 34, pipe 35 and open valve 36, downwardly through bed 31 and out to waste via pipe 39 and 41 and open valve 42. As soon as the electrolyte content of the water flowing to waste from pipe 41 has dropped to 200 parts per million or a value approximately equal to the electrolyte content of the raw water entering through pipe 13, valves 14 and 42 are closed and pump 60 is started. This initiates the recycling rinse step. The rinse water is now being recycled through pipes 39 and 61 including check valve 63, pump 60, pipes 62 (including the partly open regulating valve 64 previously adjusted for the desired rate of flow), 13 and 15 including open valve 16, bed 11, pipes 19 and 33 including open valve 34, pipe 35 including open valve 36, and downwardly through bed 31 back into pipe 39. This recycling rinse is continued until the electrolyte content of the recycled water in pipe 39 is sufficiently low whereupon pump 60 is stopped and valves 14 and 53 are opened which places the apparatus once more in normal water treating operation.

When a portion of the de-mineralized water is being recycled during normal de-mineralizing operation for the purpose of reducing the electrolyte content of the water supplied to the cation exchange unit, the regulating valve 64 serves to adjust the proportion of water being recycled to the value required to dilute the raw water to the desired degree.

The following tests illustrate the advantages obtained by prematurely interrupting the usual waste rinse step and then recycling water in closed circulation through the cation exchange unit and the acid removal unit in a recycling rinse step. In these tests, each of the units contained one cubic foot of ion exchange material, the cation exchange material being sulfonated coal and the acid removal material being aniline black compound. The water being treated contained 25 grains per gallon of cations, the anion content consisting of 18 grains of chlorides and sulfates and 7 grains of bicarbonate ions, all expressed as $CaCO_3$. These units were first regenerated in the customary manner without recycling, using 3 pounds of sulfuric acid in a 2 per cent solution for the cation exchange unit and 2½ pounds of sodium carbonate in a 5 per cent solution for regenerating the acid removal unit. The cation exchange unit effluent used for rinsing the acid removal unit contained a total of 18 grains of chlorides and sulfates as hydrochloric and sulfuric acid, respectively, expressed as calcium carbonate. One hundred gallons of this water were required to rinse the acid removal unit to a point where its effluent had an electrolyte content of about 9 parts per million, comprising 5 parts per million of methyl orange alkalinity, 2 parts per million of chlorides and 2 parts per million of sulfates, all expressed as calcium carbonate. This rinsing of the acid removal unit required a total of 100 minutes and the subsequent acid removal capacity of the acid removal unit was 233 gallons of de-mineralized water before regeneration was again in order.

Upon exhaustion of both units they were regenerated as before, except that a recycling rinse in accordance with my invention was included in the regenerating cycle of the acid removal unit. First, 30 gallons of rinse water were passed to waste which operation consumed 30 minutes. At this point the rinse effluent contained less than 20 parts per million each of chlorides and sulfates and the methyl orange alkalinity (sodium carbonate and bicarbonate) was less than 300 parts per million. Thus, the electrolyte content of the rinse water was somewhat lower than that of the raw water. Recycling was then started at a rate somewhat more than double that of the waste rinse, 70 gallons of water being recycled within a space of 30 minutes. At that time, that is within 60 minutes from the start of the rinsing operations, the analysis of the rinse effluent was approximately the same as that obtained at the end of the rinse in the first test where no rinse water was recycled. When placed in normal use the acid removal unit then produced a total of 302 gallons before regeneration was again required.

It is thus seen that the recycling rinse increased the useful plant output from 233 to 302 gallons which is about 30 per cent; it reduced the time required for rinsing from 100 to 60 minutes which is 40 per cent, and it reduced the amount of rinse water sent to waste from 100 to 30 gallons which is 70 per cent. In addition to these savings on the acid removal unit there was also a substantial increase in the useful output of the cation exchange unit. The average cation content of the 70 gallons of recycled rinse water was only about 25 per cent of that of the raw water so that the amount of capacity of the cation exchange unit preserved for use by recycling amounted to 75 per cent of 70 gallons which is about 52 gallons; this constituted about 16 per cent of the cation exchange capacity between regenerations.

The losses in capacity for the above described tests are graphically shown in Figs. 2 and 3 for operation without and with recycling rinse, respectively, and the large savings in capacity due to recycling are clearly shown in Fig. 3. In both Figures 2 and 3, the abscissa is gallons of rinse water and the ordinate is cation or free mineral acid content in grains per gallon, so that an area in these graphs represents the product of gallons times grains per gallon, i. e. grains of cations or free mineral acidity, respectively. The heavy solid lines denote the cation content of the influent to the cation exchange unit, and the heavy broken lines denote the free mineral acid content of the influent to the acid removal unit. The areas below the heavy solid lines (covered by solid shading lines slanting downwardly to the left) represent the loss in cation exchange capacity. The areas below the heavy broken lines (covered by solid shading lines slanting downwardly to the right) represent the loss in acid removal capacity. Fig. 3, by the relatively smaller size of these areas, shows the extent to which the losses are reduced by the combination of waste rinse and recycling rinse in accordance with my invention instead of the previous use of a waste rinse step only. In order to further visualize the magnitude of the savings in capacity by the use of my invention, the area representing the saving in cation removal capacity has been indicated by broken shading lines slanting downwardly to the left in Fig. 3, and the area representing the saving in acid removal capacity has been indicated by broken shading lines slanting downwardly to the right.

The saving in time required for rinsing means of course that a smaller, less expensive installation can be made which occupies less space since the equipment is available for useful service during a greater proportion of the time. The increase in capacity, between regenerations, of both units, obtained without increasing the quantities of regenerants, means a saving in chemicals and thus a lower treatment cost per unit quantity of water, and the saving in wash water reduces the treatment cost still further.

While the above example relates to a relatively small plant containing but one cubic foot of each of the ion exchange materials the same percentages of savings are obtained in large installations where hundreds of cubic feet of water treating material are used, and in such cases these savings amount to substantial sums.

While I have disclosed what I consider preferred forms of my invention with regard to both process and apparatus, modifications may be made without departing from the spirit of my invention, and reference is, therefore, made to the appended claims for a definition of the scope of my invention.

What I claim is:

1. A process of operating a water de-mineralizing installation comprising a cation exchange unit and an acid removal unit, which comprises treating the acid removal unit periodically with a dilute alkali solution, then flowing raw water successively through the cation exchange unit and the acid removal unit to waste, then interrupting the flow of raw water to the cation exchange unit, and applying a recycling rinse step by flowing water in closed circulation through both said units.

2. In the process of claim 1, interrupting the flow of water to the cation exchange unit when the water flowing from the acid removal unit has approximately the same electrolyte content as the raw water.

3. In the process of claim 1, interrupting the recycling when the electrolyte content of the rinse water leaving the acid removal unit has dropped to a value of the order of ten parts per million, and then restoring the installation to normal water de-mineralizing service.

4. A process of de-mineralizing raw water which comprises successively passing the water through cation exchange material and acid removal material, recycling a predetermined proportion of water leaving the acid removal material and mixing said proportion with raw water flowing to the cation exchange material, and flowing the remaining portion of water leaving the acid removal material to service.

5. The process of claim 4, the proportion of recycled water being sufficient to reduce the combined sulfate and chloride content of the mixed raw and recycled water to less than three hundred parts per million, expressed as calcium carbonate.

6. Apparatus for de-mineralizing water which comprises a tank containing cation exchange material, a tank containing acid removal material, a system of piping for said tanks including a supply pipe for the first tank, a pipe interconnecting both said tanks, an outlet pipe for the second tank, a waste pipe and a service pipe both connected with said outlet pipe, and a recycling conduit connecting said outlet pipe with said supply pipe, and means for inducing flow through said recycling conduit from said outlet pipe to said supply pipe.

7. Apparatus for de-mineralizing water which comprises a tank containing cation exchange material, a tank containing acid removal material, a system of piping for said tanks including a supply pipe for the first tank, a pipe interconnecting both said tanks, an outlet pipe for the second tank, and a waste pipe and a service pipe both connected with said outlet pipe, and a pump having a suction pipe connected with said outlet pipe and a discharge pipe connected with said supply pipe.

8. A process of operating a water de-mineralizing installation including a cation exchange unit and an acid removal unit, which comprises successively passing a given volume of water through the cation exchange unit and the acid removal unit and recycling to the cation exchange unit all of said water leaving the acid removal unit until the electrolyte content of said water has dropped to a predetermined low value, and then flowing said water to service.

9. Apparatus for de-mineralizing water which comprises a tank containing cation exchange material, a tank containing acid removal material, a system of piping for said tanks including a supply pipe for one of said tanks, a pipe interconnecting both said tanks, an outlet pipe for the other tank, a waste pipe and a service pipe both adapted to be placed in communication with said outlet pipe, a recycling conduit connected with said supply pipe and adapted to receive water from said outlet pipe, and means for inducing flow through said recycling conduit towards said supply pipe.

RAY RILEY.